United States Patent
Bono et al.

(10) Patent No.: US 9,592,446 B2
(45) Date of Patent: Mar. 14, 2017

(54) ELECTRONIC GAME PROVIDING DEVICE AND NON-TRANSITORY COMPUTER-READABLE STORAGE MEDIUM STORING ELECTRONIC GAME PROGRAM

(71) Applicant: DeNA Co., Ltd., Tokyo (JP)

(72) Inventors: Hironori Bono, Tokyo (JP); Takashi Ninjouji, Tokyo (JP)

(73) Assignee: DENA CO., LTD., Tokyo (JP)

( * ) Notice: Subject to any disclaimer, the term of this patent is extended or adjusted under 35 U.S.C. 154(b) by 202 days.

(21) Appl. No.: 14/569,388

(22) Filed: Dec. 12, 2014

(65) Prior Publication Data

US 2015/0165319 A1 Jun. 18, 2015

(30) Foreign Application Priority Data

Dec. 13, 2013 (JP) ................................. 2013-258136

(51) Int. Cl.
- A63F 9/24 (2006.01)
- A63F 13/35 (2014.01)
- A63F 13/48 (2014.01)
- A63F 13/79 (2014.01)

(52) U.S. Cl.
CPC .............. *A63F 13/35* (2014.09); *A63F 13/48* (2014.09); *A63F 13/79* (2014.09)

(58) Field of Classification Search
None
See application file for complete search history.

(56) References Cited

U.S. PATENT DOCUMENTS

| 7,076,434 | B1 * | 7/2006 | Newnam | A63F 13/12 463/7 |
| 8,684,807 | B1 * | 4/2014 | Crici | A63F 13/795 434/322 |
| 2001/0044339 | A1 * | 11/2001 | Cordero | A63F 13/12 463/42 |
| 2004/0259641 | A1 * | 12/2004 | Ho | A63F 13/12 463/42 |
| 2005/0226166 | A1 * | 10/2005 | Agrawal | H04L 67/2828 370/252 |
| 2006/0100006 | A1 * | 5/2006 | Mitchell | G07F 17/32 463/9 |
| 2007/0191101 | A1 * | 8/2007 | Coliz | A63F 13/12 463/42 |
| 2008/0113810 | A1 | 5/2008 | Kubota et al. | |
| 2009/0117970 | A1 * | 5/2009 | De Waal | G07F 17/32 463/20 |

(Continued)

FOREIGN PATENT DOCUMENTS

| JP | 2006-166933 A | 6/2006 |
| JP | 2013-081760 A | 5/2013 |

(Continued)

*Primary Examiner* — Paul A D'Agostino

(57) ABSTRACT

Play information storing play information about an electronic game is transmitted to a client. In response to access from the client, the game effectiveness of the electronic game for a user having accessed from the client is determined. When the game effectiveness for the user holds true, an operation of the electronic game by the user is allowed. When the game effectiveness for the user does not hold true, an operation of the electronic game by the user is not allowed.

11 Claims, 5 Drawing Sheets

(56) References Cited

U.S. PATENT DOCUMENTS

| | | | |
|---|---|---|---|
| 2009/0191962 A1* | 7/2009 | Hardy | G07F 17/32 463/29 |
| 2009/0280904 A1* | 11/2009 | Nicely | G07F 17/3211 463/40 |
| 2010/0178986 A1* | 7/2010 | Davis | G07F 17/32 463/42 |
| 2010/0227686 A1* | 9/2010 | Brunet De Courssou | G07F 17/32 463/31 |
| 2010/0227689 A1* | 9/2010 | Brunet de Courssou | G07F 17/32 463/37 |
| 2012/0157191 A1* | 6/2012 | Burke | G07F 17/32 463/25 |
| 2013/0053138 A1* | 2/2013 | Pereira | A63F 13/795 463/29 |
| 2013/0252713 A1* | 9/2013 | Nelson | G07F 17/3206 463/25 |
| 2014/0018141 A1* | 1/2014 | Anikin | G06Q 30/0207 463/16 |
| 2014/0274415 A1* | 9/2014 | Benzon | A63F 13/843 463/42 |

FOREIGN PATENT DOCUMENTS

| | | |
|---|---|---|
| JP | 2013-128583 A | 7/2013 |
| JP | 2014-018324 A | 2/2014 |

* cited by examiner

| USER ID | PLAY DATA ID | GAME URL |
|---------|--------------|----------|
| a0001 | a0001 001 | http://···. |
| a0001 | a0001 002 | http://···. |
| a0001 | a0001 003 | http://···. |
| a0001 | a0001 004 | http://···. |
| a0002 | a0002 001 | http://···. |
| a0003 | a0003 001 | http://···. |

ELECTRONIC GAME PROVIDING DEVICE AND NON-TRANSITORY COMPUTER-READABLE STORAGE MEDIUM STORING ELECTRONIC GAME PROGRAM

BACKGROUND OF THE INVENTION

Field of the Invention

The present invention relates to an electronic game providing device and a non-transitory computer-readable storage medium storing an electronic game program.

Description of Related Art

There is disclosed a technique in which a first user registered for a game service invites a second user not yet registered for the game service to make a registration, and when the second user invited newly makes a registration, a bonus is given to the first user having invited the second user (JP 2013-81760 A).

SUMMARY OF THE INVENTION

Meanwhile, the user invited cannot enjoy a game unless he/she makes a registration for the game service and then goes through a tutorial, etc., for how to play the game, etc. Accordingly, the user may not reach the stage where he/she can actually enjoy the game. Particularly, the user turns out to watch the basic operation of the game and thus may cancel the use of the game before getting to a more appealing content of the game.

An object of the present invention is to provide an electronic game providing device and a non-transitory computer-readable storage medium storing an electronic game program that can smoothly introduce a user invited to a game to the game.

One aspect of the present invention is directed to an electronic game providing device including: a play information storage unit configured to store play information about an electronic game; a play information transmitting unit configured to transmit the play information to a client; and a determining unit configured to determine, in response to access from the client, game effectiveness of the electronic game for a user having accessed from the client, wherein the determining unit allows an operation of the electronic game by the user when the game effectiveness for the user holds true, and does not allow an operation of the electronic game by the user when the game effectiveness for the user does not hold true.

Here, it is preferred that the game effectiveness hold true when the user is registered as a user of the electronic game, and not hold true when not registered, and when the game effectiveness holds true, the determining unit read play information of the user from the play information storage unit and allow the electronic game to continue based on the play information, and when the game effectiveness does not hold true, the determining unit read play information of a user other than the user that satisfies a predetermined condition from the play information storage unit and reproduce or live-stream the electronic game based on the play information.

In addition, it is preferred that the electronic game be reproduced or streamed live on the client based on the play information, and the determining unit determine, in response to access from the client during the reproduction or live-streaming of the electronic game, game effectiveness of the electronic game for the user having accessed from the client, and start the electronic game when the game effectiveness holds true, and continue the reproduction or live-streaming of the electronic game when the game effectiveness does not hold true.

Another aspect of the present invention is directed to a non-transitory computer-readable storage medium storing an electronic game program causing a computer to function as: a play information receiving unit configured to receive play information about an electronic game; and a play information processing unit configured to allow, in response to access from a client, an operation of the electronic game by a user according to the play information when game effectiveness of the electronic game for the user holds true, and does not allow an operation of the electronic game by the user when the game effectiveness for the user does not hold true, the user having accessed from the client.

Here, it is preferred that the game effectiveness hold true when the user is registered as a user of the electronic game, and not hold true when not registered, and when the game effectiveness holds true, the play information processing unit receive play information of the user and allow the electronic game to continue based on the play information, and when the game effectiveness does not hold true, the play information processing unit receive play information of a user other than the user that satisfies a predetermined condition and reproduce or live-stream the electronic game based on the play information.

According to the present invention, a user can be smoothly introduced to an electronic game.

DETAILED DESCRIPTION OF THE INVENTION

Figure 1:
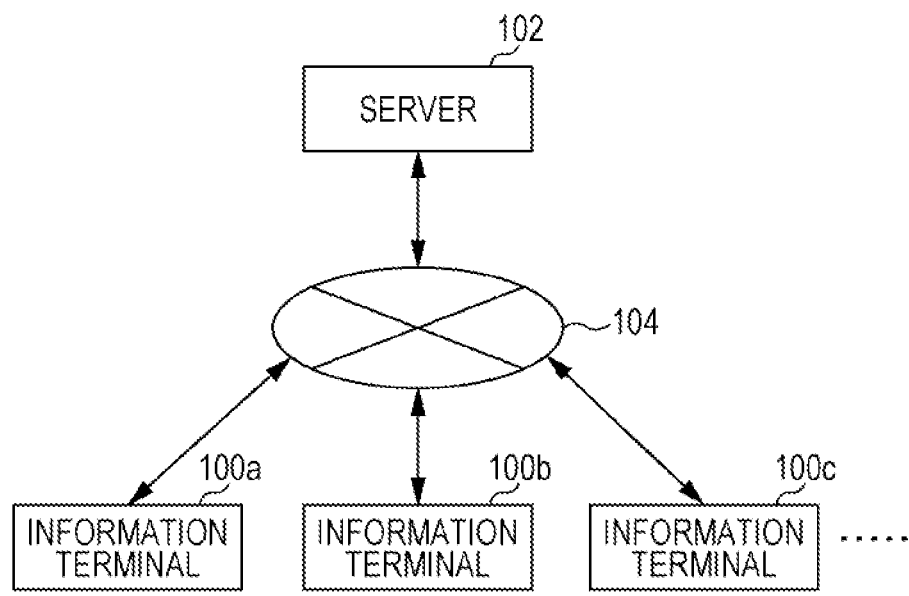
FIG. 1 is a diagram illustrating a configuration of an electronic game system of an embodiment of the present invention.

As illustrated in FIG. 1, an electronic game system of an embodiment of the present invention is configured to include information terminals 100 and a server 102. The server 102 is communicably connected to the plurality of information terminals 100 (100a, 100b . . . ) through an information communication network 104. The server 102 provides information so that electronic games can be played on the information terminals 100.

Figure 2:
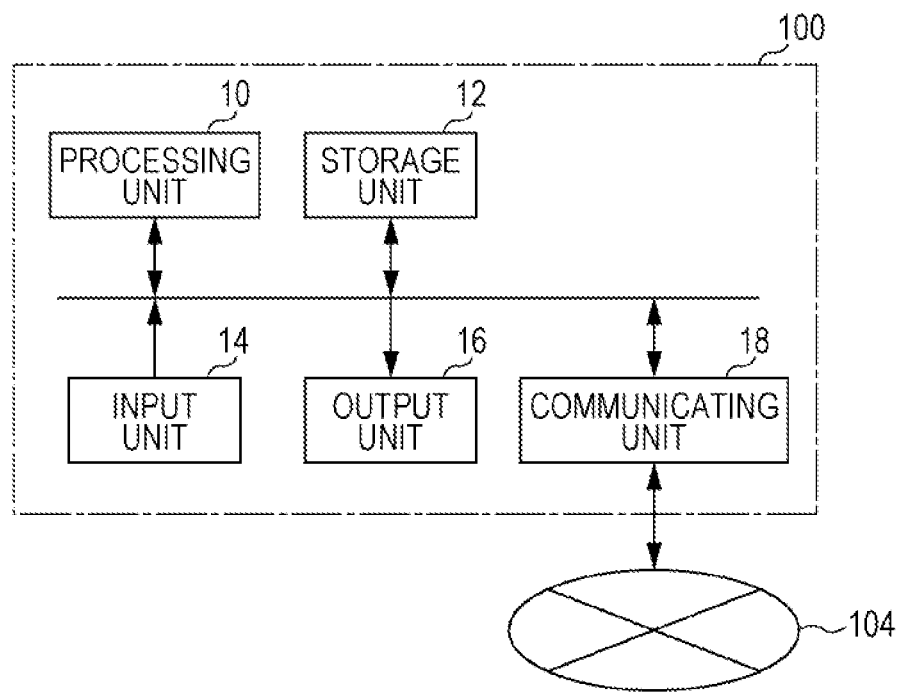
FIG. 2 is a diagram illustrating a configuration of an information terminal of the embodiment of the present invention.

As illustrated in FIG. 2, each information terminal 100 is configured to include a processing unit 10, a storage unit 12, an input unit 14, an output unit 16, and a communicating unit 18. The information terminal 100 has the basic configuration of a communicable portable terminal such as a mobile phone, a smartphone, or a tablet terminal. In the present embodiment, the information terminal 100 functions as an electronic game device for a user to play electronic games.

The processing unit 10 includes a unit for performing arithmetic processing, such as a CPU. The processing unit 10 implements functions related to an electronic game on the information terminal 100 by executing an electronic game program stored in the storage unit 12. The storage unit 12 includes a storage unit such as a semiconductor memory or a memory card. The storage unit 12 is connected to the processing unit 10 in an accessible manner and stores the electronic game program and information such as data and a database required to process the electronic game. The input unit 14 includes a unit for inputting information to the information terminal 100. The input unit 14 includes, for example, a touch panel and buttons that accept inputs from the user. The output unit 16 includes a unit for outputting a user interface screen (UI) for accepting input information from the user, etc., and processing results on the information terminal 100. The output unit 16 includes, for example, a display that presents the user with images. The communicating unit 18 is configured to include an interface for exchanging information with other information communication devices through the information communication network 104. Communication performed by the communicating unit 18 may be wired or wireless.

Figures 3, 4:
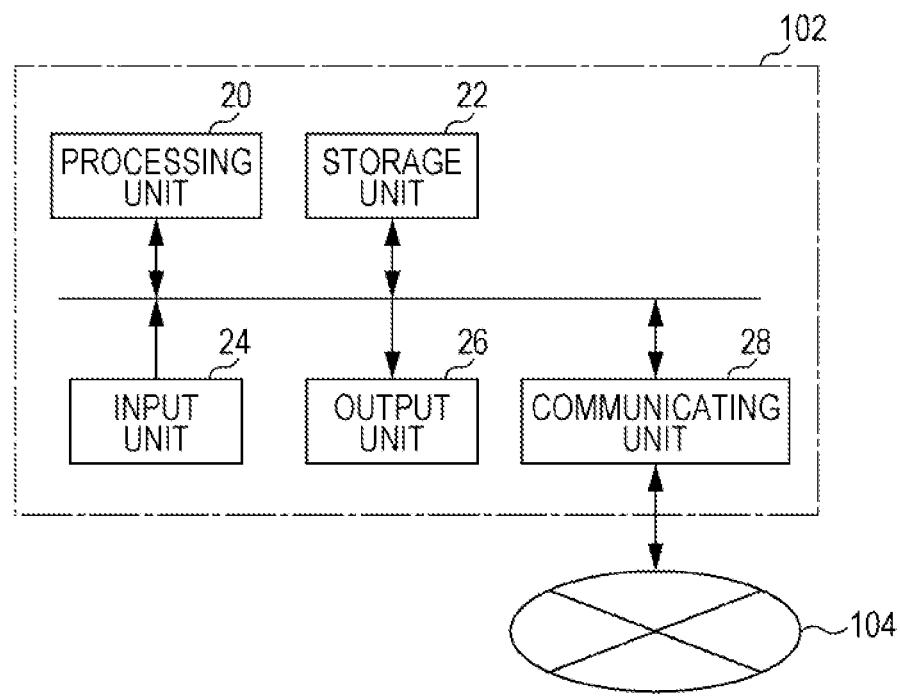
FIG. 3 is a diagram illustrating a configuration of a server of the embodiment of the present invention.
FIG. 4 is a diagram illustrating a registration example of a play database of the embodiment of the present invention.

As illustrated in FIG. 3, the server 102 is configured to include a processing unit 20, a storage unit 22, an input unit 24, an output unit 26, and a communicating unit 28. The server 102 has the basic configuration of a computer having a communication function. In the present embodiment, the server 102 functions as an electronic game providing device.

The processing unit 20 includes a unit for performing arithmetic processing, such as a CPU. The processing unit 20 controls functions that can be used by the information terminals 100, by executing an electronic game providing program stored in the storage unit 22. The storage unit 22 includes a storage unit such as a semiconductor memory or a hard disk. The storage unit 22 is connected to the processing unit 20 in an accessible manner and stores the electronic game providing program and information such as data and a database which are obtained from the information terminals 100 and used for an electronic game. Note that the storage unit 22 functions as a play information storage unit that stores play information which will be described later. The input unit 24 includes a unit for inputting information to the server 102. The input unit 24 includes, for example, a keyboard that accepts inputs from a user. The output unit 26 includes a unit for outputting a user interface screen (UI) for accepting input information from the user, etc., and processing results on the server 102. The output unit 26 includes, for example, a display that presents the user with images. The communicating unit 28 is configured to include an interface for exchanging information with the information terminals 100 and other information communication devices through the information communication network 104. Communication performed by the communicating unit 28 may be wired or wireless.

In the present embodiment, it is assumed that a user A has an information terminal 100a and a user B has an information terminal 100b. In addition, it is assumed that the user A is registered for an electronic game service provided by the server 102 using the information terminal 100a and is playing an electronic game provided by the service. On the other hand, for the user B, a description will be made of the case in which the user B is registered for the electronic game service provided by the server 102 and the case in which the user B is not registered for the electronic game service.

In addition, in the present embodiment, it is assumed that the electronic game program executed by the information terminals 100 includes the function of obtaining information about an electronic game being played by the user and uploading the information to the server 102. The server 102 registers the information (play information) about the electronic game uploaded from the information terminals 100 in a play database in the storage unit 22 on a user-by-user basis.

The information (play information) about the electronic game may be pictures or a moving image that store(s) video obtained during electronic game play or may be a log of inputs performed by a player in the electronic game. In addition, uploading of the information about the electronic game may be performed automatically or may be performed by an instruction from the player of the electronic game.

The play database stores, as illustrated in a registration example of FIG. 4, user IDs, play data IDs, and game URLs in association with each other. The play database is stored in the storage unit 22 of the server 102.

The user ID is an identifier that identifies a user registered for the electronic game service provided by the server 102. The user ID is assigned a unique identifier for each user.

The play data ID is an identifier used to read parameters and data for executing an electronic game being played by a user identified by a user ID associated therewith. In the storage unit 22 of the server 102, parameters and data which are used when providing an electronic game while communicating with an information terminal 100 are registered in association with a play data ID. When a play data ID is specified, the server 102 reads parameters and data associated with the play data ID and executes an electronic game based on those pieces of information.

Note that specific processes for an electronic game are not the characteristic matters of the invention of the present application and thus a specific description thereof is omitted.

The game URL is link information for viewing past plays performed in an electronic game by a first user identified by a user ID associated therewith or for actually playing the electronic game, when the first user invites a second user to the electronic game service. In the storage unit 22 of the server 102, records (play information such as still images, a moving image, and a log of inputs) obtained when a user identified by an associated user ID plays an electronic game as a player and registers a play data ID are stored in association with a game URL. By accessing a game URL, information associated with the game URL is read and thus the plays of an electronic game can be viewed or the electronic game can be actually operated and played, based on the game effectiveness for the accessed user.

Note that a plurality of play data IDs and a plurality of game URLs may be registered for the same user. In the example of FIG. 4, four sets of a play data ID and a game URL are registered for a user with the user ID "a0001".

In addition, registration in the play database may be performed after the user has finished playing the electronic game. Alternatively, the registration may be performed by an instruction from the user in the middle of the user playing the electronic game.

Figure 5:
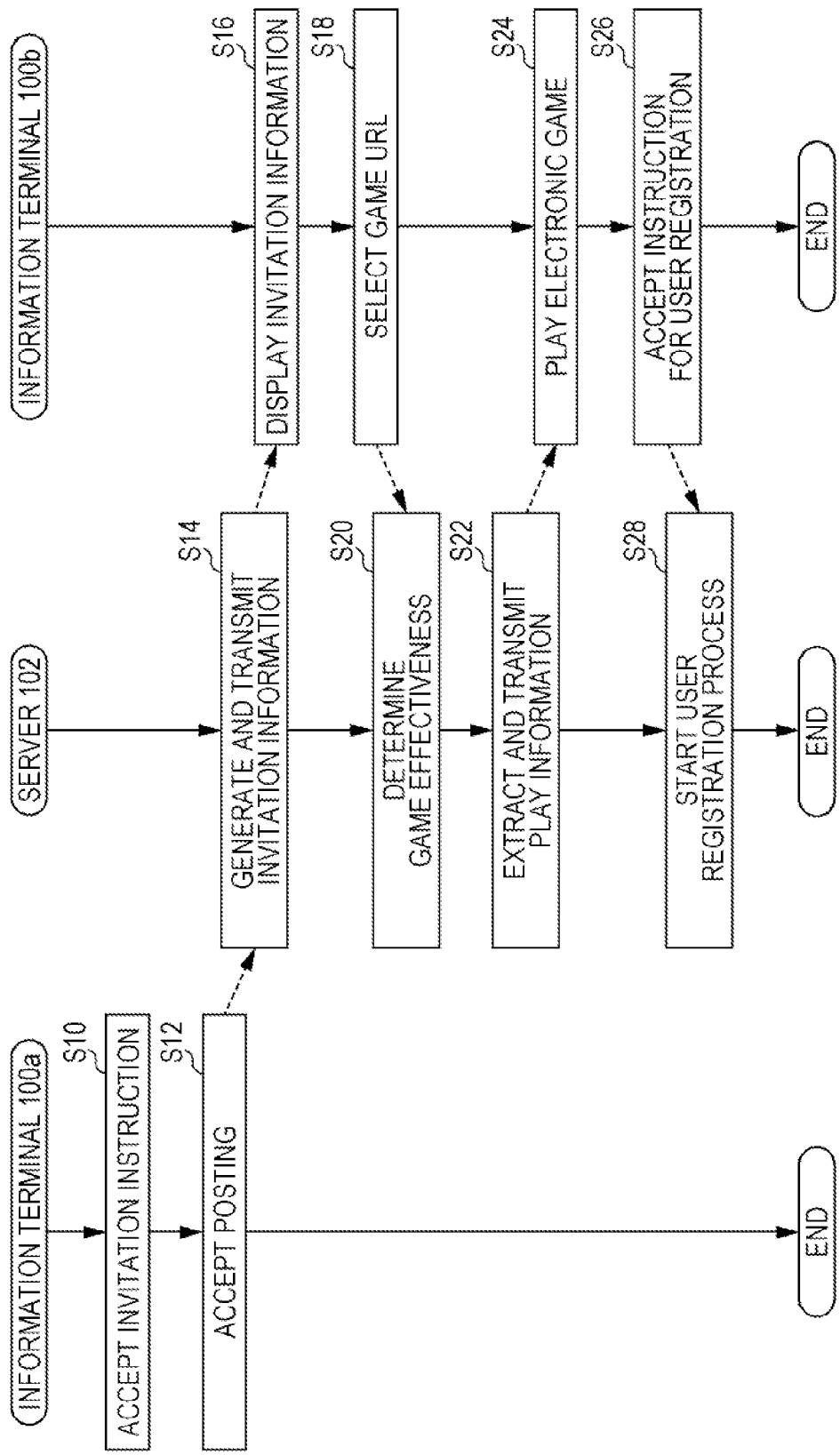
FIG. 5 is a flowchart of an invitation process of the embodiment of the present invention.

The process of inviting to the electronic game service of the present embodiment will be described below with reference to a flowchart of FIG. 5. In the following description, an example will be described in which the user A using the information terminal 100a invites the user B using the information terminal 100b to the electronic game service through the server 102. Note that by performing the following processes the information terminals 100a and 100b and the server 102 function as unit for performing their respective processes.

At step S10, the information terminal 100a accepts an instruction to invite another user to the electronic game service. The process at this step corresponds to an invitation instruction accepting unit. While the user A which is a first user is playing an electronic game or after finishing playing, a selecting unit for inviting another user to the electronic game service is displayed on the output unit 16 of the information terminal 100a. When the user A selects (taps in the case of a touch panel) the selecting unit on the screen, the process of inviting another user starts.

At step S12, the information terminal 100a posts to a messaging tool or SNS. The process at this step corresponds to a posting accepting unit. The information terminal 100a displays an interface screen urging to post to a messaging tool or SNS for inviting another user to the electronic game service. Accordingly, the user A identifies another user (user B) which is a target of the invitation to the electronic game service. The user A, for example, inputs a destination address of a message to the user B which is the invitation target or access information to SNS. The information terminal 100a transmits to the server 102 the user ID of the user A which is the inviter and the access information to the user B which is identified as the invitation target.

Note that posting to the messaging tool or SNS may be performed without identifying a user. Specifically, posting by a user which is an inviter is transmitted to a server of the messaging tool or SNS and made public to a plurality of users such as the friends of the user which is the transmitter or other SNS users. Then, by a user accessing the server of the messaging tool or SNS, the posting is displayed on an information terminal 100 of the user.

Note that an input of a message from the user which is the inviter to the user which is the invitation target may be accepted and the message may be transmitted to the server 102.

Alternatively, when an invitation process starts, the server 102 may transmit to the information terminal 100a information (hypertext, etc.) about an interface urging to post to a messaging tool or SNS for inviting another user to the electronic game service, and the information terminal 100a may post using the interface.

At step S14, an invitation of the user which is the invitation target is performed. The process at this step corresponds to an invitation information transmitting unit. When the server 102 receives from the information terminal 100a the user ID of the user A which is the inviter and the access information to the user B which is the invitation target, the server 102 transmits invitation information to the information terminal 100b of the user B. The server 102 reads a game URL associated with the user ID of the user A which is the inviter by referring to the play database stored in the storage unit 22, and transmits invitation information (hypertext, etc.) including the read game URL to the information terminal 100b.

In addition, when posting to the messaging tool or SNS is performed without identifying a user, a game URL associated with the user ID of the user A which is the inviter is included in the posting. The server 102 transmits invitation information including the game URL to the server providing the messaging tool or SNS service. By this, other users can receive an invitation from the user A by accessing the messaging tool or SNS.

At this time, if there is a message to the user which is the invitation target from the user which is the inviter, the message may be transmitted included in the invitation information.

In addition, when a plurality of game URLs are registered for the user which is the inviter, all information may be transmitted included in the invitation information. Alternatively, the user which is the transmitter may specify one of the game URLs.

At step S16, the invitation information is displayed on the information terminal 100b of the user B which is the invitation target. The process at this step corresponds to an invitation information receiving unit and an invitation information displaying unit. In response to the invitation information from the server 102, the information terminal 100b of the user B displays information for inviting the user B to the electronic game service, on the output unit 16 of the information terminal 100b. It is preferred that a screen displayed contain a hyperlink of the game URL.

At step S18, an instruction to play (try) the electronic game is accepted. The process at this step corresponds to a play instruction accepting unit. The user B specifies the game URL (hyperlink) on the screen. When the game URL is specified, the information terminal 100b transmits the game URL to the server 102.

In addition, information about the user B is simultaneously transmitted to the server 102. For example, if there is a history of use of other electronic games of the provider (electronic game providing company) of the electronic game which is the processing target in the present embodiment or there is information obtained when visiting websites of those other electronic games, those pieces of information are transmitted to the server 102. Specifically, as the web browser cookies of the information terminal 100b of the user B, data about the user B (the history of use of electronic games, whether the user B has visited the websites, the number of visits, a user registration history, etc.) may be stored and those pieces of information may be transmitted to the server 102.

At step S20, the process of checking game effectiveness is performed. The process at this step corresponds to a determining unit. The game effectiveness holds true when the user requested to play at step S18 is in a state of being able to play the electronic game which is the request target, and does not hold true otherwise. For example, the game effectiveness holds true when the user B is registered as a user of the electronic game service that the user B is requested to play, and does not hold true otherwise. Alternatively, for example, even if the user B is not registered as a user of the electronic game service that the user B is requested to play, when the user B is registered as a user in the company of the provider of the electronic game service, the game effectiveness may hold true, and may not hold true otherwise. Alternatively, for example, the game effectiveness may hold true when the information terminal 100b of the user B is communicable with the server 102, and may not hold true otherwise. Note that the game effectiveness is not limited to these examples of conditions.

First, the case in which it is determined that the game effectiveness holds true will be described below. The case in which the game effectiveness does not hold true will be described later.

At step S22, play information for playing the electronic game is transmitted to the information terminal 100b. The process at this step corresponds to a play information transmitting unit. The server 102 reads from the storage unit 22 play information for resuming a game which is registered in association with the game URL specified by the user B, and transmits the play information to the information terminal 100b. At this time, if there is an application or the like required to execute the electronic game on the information terminal 100b, the play information is transmitted including the application or the like.

When the user B is not registered as a user of the electronic game service, a registration URL (a hyperlink is preferred) for registering for the electronic game service after playing the electronic game is transmitted to the information terminal 100b in addition to the play information.

At step S24, the electronic game starts based on the play information. The process at this step corresponds to a play information receiving unit and a play information processing unit. When the information terminal 100b receives the play information from the server 102, the information terminal 100b starts the electronic game based on the play information. When the electronic game starts, the information terminal 100b accepts a user operation from the input unit 14 and proceeds the electronic game based on the operation. At this time, an application required to play the electronic game may be, for example, downloaded from the server 102 and executed as necessary.

For example, for the play information, play information is registered such that the electronic game starts from a scene immediately before the user A can clear a given stage of the electronic game. By this, the user B can easily know how to clear the electronic game. In addition, the user B can really feel enjoyment in clearing the electronic game. Alternatively, for the play information, play information is registered such that the electronic game resumes from a scene where the user A is battling with a raid boss in the electronic game or a scene where the user A is playing a special stage. By this, the user B can experience fun specific to the electronic game without going through a cumbersome procedure.

By thus allowing the user which is the invitee to play from a scene where the user which is the inviter is playing the electronic game, the user B is easily allowed to really feel the fun of the electronic game. In addition, communication between the user A and the user B is activated.

In addition, when the user B is not registered for the electronic game service, a psychological obstacle for the user B to register the electronic game service is reduced, enabling to smoothly lead the user B to the electronic game. In addition, before the user B is registered as a user for the electronic game service, the user B can determine whether the electronic game provided by the electronic game service to which the user B is invited is fun. Note that the start of the electronic game and the user registration may be simultaneously performed.

At step S26, an instruction for a user registration is accepted from the user which is the invitee. The process at this step corresponds to a user registration instruction accepting unit. A registration URL (hyperlink) is displayed on the output unit 16 of the information terminal 100b. When the user B registers for the electronic game service, the user B selects the displayed registration URL. When the registration URL is selected, the information terminal 100b transmits the registration URL to the server 102.

At step S28, the process of registering the user B for the electronic game service starts. The process at this step corresponds to a user registering unit. When the server 102 receives the registration URL from the information terminal 100b, the server 102 transmits information for registering for the electronic game service to the information terminal 100b. The information for registering may be, for example, hypertext of a registration website.

At this time, the server 102 may determine, based on the information transmitted from the information terminal 100b of the user B, whether the user B is a registered user which is already registered for the electronic game service or a new user not registered, and perform a user registration process only when the user B is determined to be a new user. This process corresponds to a user registration determining unit.

By this, the user B can be registered as a new user of the electronic game service. Note that, for the registration process, existing methods can be applied and thus a description thereof is omitted.

Note that, when the server 102 transmits play information for playing the electronic game to the information terminal 100b at step S22, if the user B has already registered for the electronic game service which is the play target, the server 102 may transmit play information obtained when the user B has played the electronic game in the past to the information terminal 100b. In this case, the electronic game resumes based on the play information which is a past history of the user B instead of play information of another user, and the user B can continue play.

Figure 6:
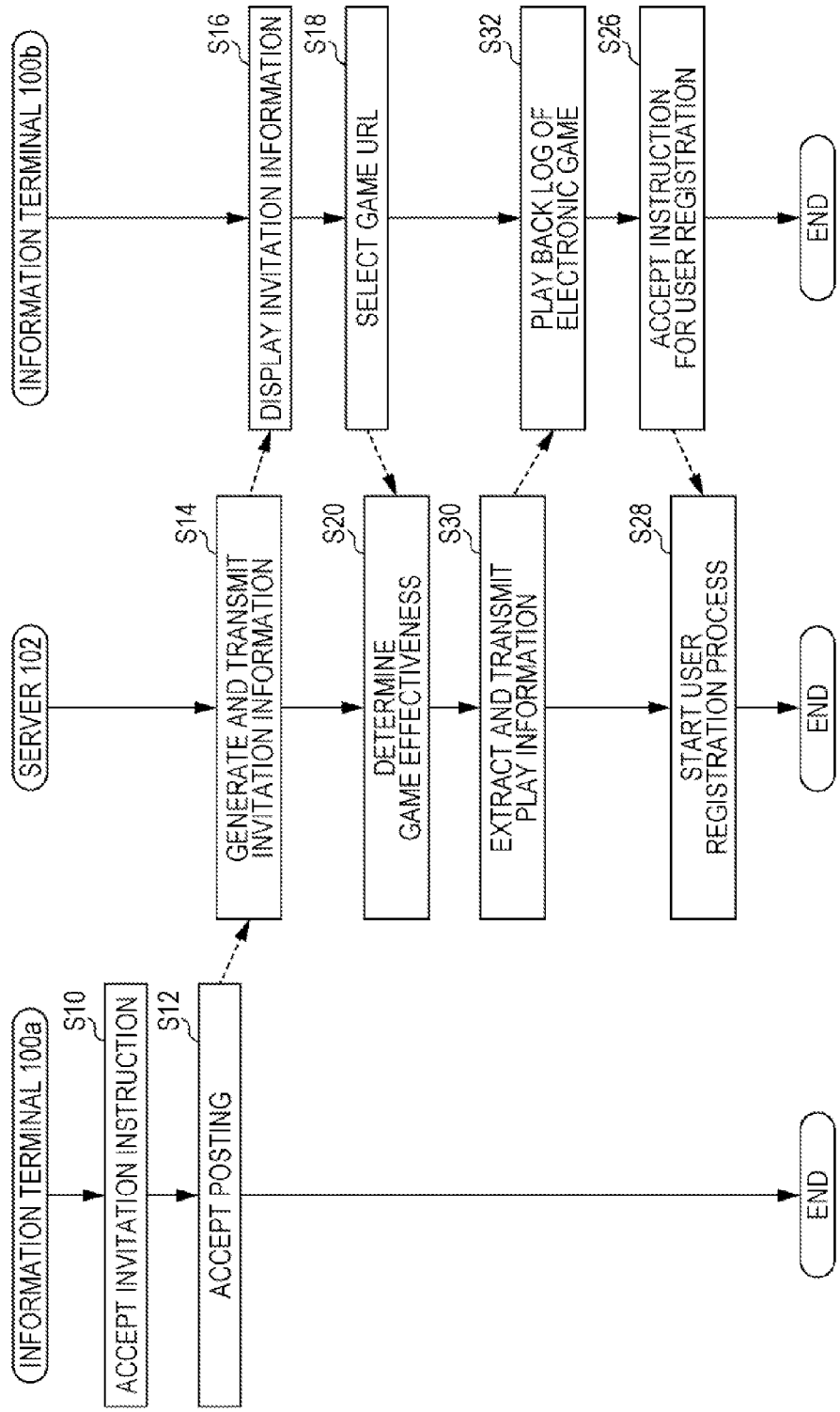
FIG. 6 is a flowchart of an invitation process of the embodiment of the present invention.

Next, with reference to FIG. 6, the case in which it is determined at step S20 that the game effectiveness does not hold true for the user B will be described.

At step S30, play information for playing back the plays of the electronic game is transmitted to the information terminal 100b. The process at this step corresponds to a play information transmitting unit. When the server 102 receives the game URL specified by the user B, the server 102 reads play information which is registered in the storage unit 22 in association with the game URL and transmits the play information to the information terminal 100b. In addition to the play information, a registration URL (a hyperlink is preferred) for registering for the electronic game service after finishing the playback of the play information is transmitted to the information terminal 100b.

At step S32, the plays of the electronic game are played back based on the play information. The process at this step corresponds to a play information receiving unit and a play information processing unit. When the information terminal 100b receives the play information from the server 102, the information terminal 100b reproduces the plays of the electronic game based on the play information. When the play information is a moving image, moving image data stored in the storage unit 22 of the server 102 may be reproduced on the information terminal 100b. When the play information is a log of inputs, the game may be automatically executed on the information terminal 100b based on the log of inputs.

For example, as the play information, information that reproduces a scene for when the user A has successfully cleared the electronic game is registered. By this, the user B can know, from the reproduction screen, how he/she should clear the electronic game. Alternatively, as the play information, information that reproduces a scene for when the user A has failed in a funny way in the electronic game is registered. By this, the user B can know fun for when he/she fails in the electronic game.

By thus reproducing a situation where the electronic game is played and presenting the user B which is the invitation target with the situation, communication between the user A and the user B is activated. In addition, a psychological obstacle for the user B to register the electronic game service is reduced, enabling to smoothly lead the user B to the electronic game. In addition, before the user B is registered as a user for the electronic game service, the user B can determine whether the electronic game provided by the electronic game service to which the user B is invited is fun.

Note that in the present embodiment, at step S32, play information of the user A having invited the user B is transmitted to the information terminal 100*b* based on the game URL, and a history of user A's plays of the electronic game is reproduced based on the play information; however, the configuration is not limited thereto. For example, play information of a user that satisfies a predetermined condition, such as play information of a top-ranked user of the electronic game, play information of a user with high activity (long playing time) during a predetermined period of time, or play information of any registered user of the electronic game, may be transmitted to the information terminal 100*b* and a history of plays may be reproduced based on the play information.

Figure 7:
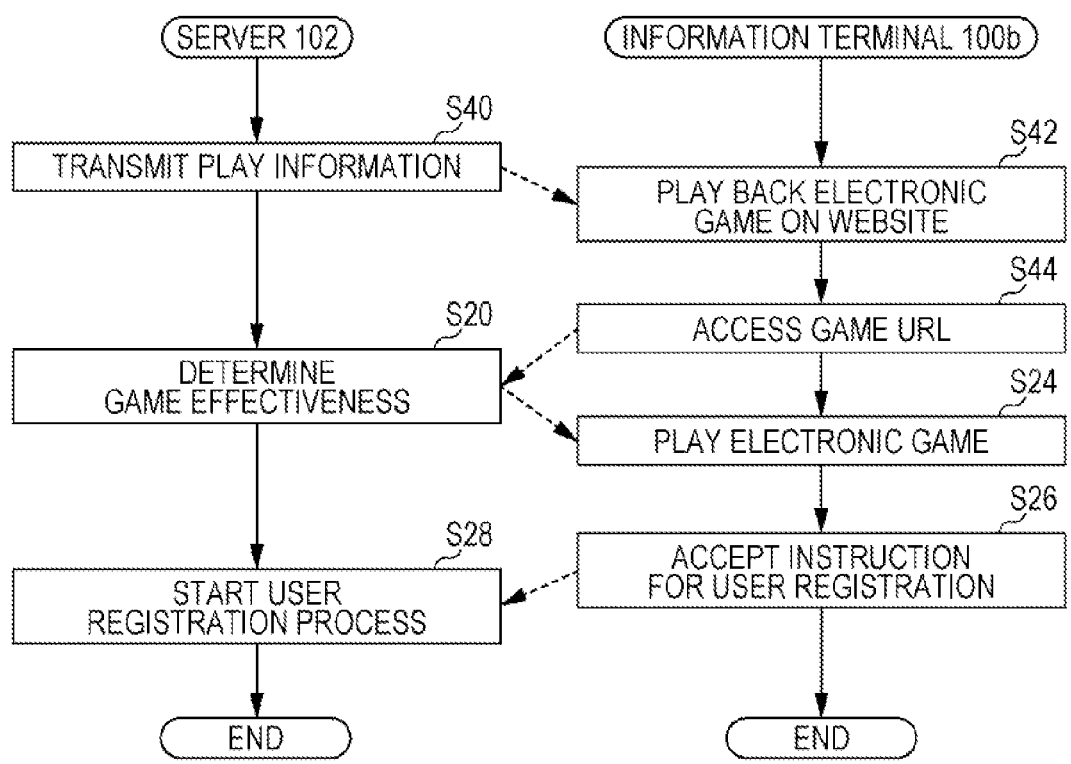
FIG. 7 is a flowchart of an invitation process of a variant of the present invention.

Note that in the above-described embodiment a mode is described in which an invitation to the electronic game service is performed by transmitting play information to a specific user; however, an electronic game may be reproduced or streamed live on a website based on play information to lead registration for the electronic game service from the website. This variant will be described with reference to a flowchart of FIG. 7.

At step S40, the server 102 transmits play information to the information terminal 100*b*. When the user B of the information terminal 100*b* has accessed a website for providing an electronic game, the play information is transmitted together with hypertext, etc., constituting the website. The process at this step corresponds to an invitation information transmitting unit. The server 102 reads a game URL and play information and a registration URL which are associated with the game URL based on a predetermined condition by referring to the play database stored in the storage unit 22 and transmits the game URL, the play information, and the registration URL to the information terminal 100*b*. For example, play information of a top-ranked user of the electronic game, play information of a user with high activity (long playing time) during a predetermined period of time, or play information of any registered user of the electronic game may be transmitted.

At step S42, the electronic game is played back or streamed live on a website on the information terminal 100*b*. When the information terminal 100*b* receives the information transmitted at step S40, the information terminal 100*b* displays a website on the output unit 16 based on the hypertext included in the received information. Along with that, the electronic game is reproduced or streamed live on the website based on the received play information. For the reproduction or live-streaming method, the same process as that of the above-described embodiment may be used.

By this, the user having accessed the website can check a state in which the electronic game is played, on his/her information terminal 100*b*. This makes it easier for the user to grasp enjoyment of the electronic game.

It is also preferred that the game URL and the registration URL be linked (e.g., hyperlinked) to the screen of the electronic game being reproduced or streamed live.

If, at step S44, the user viewing the screen of the electronic game selects the link of the game URL, an instruction to play (try) the electronic game is accepted. The process at this step corresponds to a play instruction accepting unit. When the game URL is specified, the information terminal 100*b* transmits the game URL and information about the user B to the server 102. This step may be processed in the same manner as the above-described step S18.

At step S20, the process of checking game effectiveness is performed. The process at this step corresponds to a determining unit. In this case, it is preferred that the game effectiveness hold true when the information terminal 100*b* of the user B is communicable with the server 102, and not hold true otherwise. Note, however, that the game effectiveness may hold true when the user B is registered as a user of the electronic game service that the user B is requested to play, and may not hold true otherwise. In addition, even if the user B is not registered as a user of the electronic game service that the user B is requested to play, when the user B is registered as a user in the company of the provider of the electronic game service, the game effectiveness may hold true, and may not hold true otherwise. This step is processed in the same manner as the above-described step S20.

If it is determined that the game effectiveness holds true, as with the above-described steps S24 and S26, transmission of play information for playing the electronic game to the information terminal 100*b* and resumption of the electronic game based on the play information are performed. These processes correspond to a play information transmitting unit and a play information processing unit. At this time, it is preferred that the parameters of the electronic game being reproduced or streamed live be taken over as they are and the electronic game play start from that state.

If it is determined that the game effectiveness does not hold true, electronic game play by the accessed user is not allowed, and the reproduction or live-streaming of the electronic game continues.

At step S26, an instruction for a user registration is accepted from the user which is the invitee. The process at this step corresponds to a user registration instruction accepting unit. When the user B selects the registration URL linked to the screen of the electronic game, the information terminal 100*b* transmits the registration URL to the server 102.

At step S28, the process of registering the user B for the electronic game service starts. The process at this step corresponds to a user registering unit.

By such processes, when the game effectiveness holds true, the user can start playing the game at any timing while viewing the reproduction or live-streaming of the electronic game. In addition, when the game effectiveness does not hold true, the user can continuously view the reproduction or live-streaming of the electronic game.

Note that the present variant can be applied to web advertising added to any webpage. Specifically, when the user B downloads an HTML file from a webpage distribution server to view a webpage, play information of the user A is downloaded from an electronic game providing server and displayed as web advertising. This is implemented by a creator of the webpage embedding an API for displaying the play information of the user A as web advertising, in the HTML file of the webpage.

By this, since the state of actual game plays can be shown to the user, an advertising effect is further enhanced. In addition, when there is an input to an advertising area from the user, the user is allowed to play the electronic game being played back on the web advertising from the middle of the game. Thus, a new user can be more smoothly led to the electronic game.

Alternatively, instead of the past play information of the user A, information on an electronic game currently played by the user A may be obtained and live-streaming may be performed such that the user B is allowed to view the status of the electronic game in real time. In this case, the play information of the user A may be obtained in real time from the information terminal 100a to update play information in the server 102, and the play information may be transferred to the information terminal 100b of the user B.

Alternatively, on the completion of a user registration for the electronic game service by the user B, a friend request for building a friendship in the electronic game service may be sent to the user A which is the inviter. Alternatively, on the completion of a user registration for the electronic game service by the user B, the user B and the user A may be considered as friends. These processes correspond to a friendship building unit. By this, the user A can start the game with his/her friend present, enabling to increase the motivation of the user A to start the game.

In addition, in the above-described embodiment, a mode is described in which the server 102 performs management of play information, etc.; however, some or all of the processes performed by the server 102 may be performed by the information terminal 100a or 100b or may be performed by other information terminals 100.

What is claimed is:

1. An electronic game providing device comprising:
a play information storage unit configured to store play information about an electronic game, the play information indicating a predetermined stage in the electronic game;
a play information transmitting unit configured to transmit the play information to a client; and
a determining unit configured to determine, in response to access from the client, a game effectiveness of the electronic game for the client, the game effectiveness holding true when the game is currently playable on the client and holding false when the game is currently unplayable on the client,
wherein the determining unit allows the client to operate the electronic game at the predetermined stage indicated by the play information when the game effectiveness holds true, and live-streams the electronic game on the client from the predetermined stage without allowing the client to operate the electronic game when the game effectiveness holds false.

2. The electronic game providing device according to claim 1, wherein the game effectiveness holds true when a user of the client is registered with an electronic game service, and holds false when the user is unregistered.

3. The electronic game providing device according to claim 1,
wherein the determining unit redetermines the game effectiveness, in response to access from the client during the live-streaming of the electronic game, allows the client to operate the electronic game when the redetermined game effectiveness holds true, and continues the live-streaming of the electronic game when the redetermined game effectiveness holds false.

4. A non-transitory computer-readable storage medium storing an electronic game program causing a computer to:
receive play information about an electronic game, the play information indicating a predetermined stage of the electronic game; and
allow a client to operate the electronic game in response to an access from the client when a game effectiveness holds true, the electronic game being operated at the predetermined stage indicated by the play information; and
live-stream the electronic game on the client from the predetermined stage without allowing the client to operate the electronic game when the game effectiveness holds false,
wherein the game effectiveness holds true when the electronic game is playable on the client, and the game effectiveness holds false when the electronic game is unplayable on the client.

5. The electronic game providing device according to claim 1, wherein the play information further indicates a scene in the predetermined stage, the scene starting before the predetermined stage is cleared, and
wherein the determining unit allows the client to operate the electronic game at the scene indicated by the play information when the game effectiveness holds true.

6. The non-transitory computer-readable storage medium of claim 4, wherein the play information further indicates a scene in the predetermined stage, the scene starting before the predetermined stage is cleared, and
wherein the client is allowed to operate the electronic game at the scene indicated by the play information when the game effectiveness holds true.

7. A method executed by a server, the method comprising:
determining a game effectiveness of a client, the game effectiveness holding true when an electronic game is playable on the client and holding false when the electronic game is unplayable on the client;
allowing the client to operate the electronic game at a predetermined stage indicated by play information when the game effectiveness holds true; and
live-streaming the electronic game on the client from the predetermined stage without allowing the client to operate the electronic game when the game effectiveness holds false.

8. The method of claim 7, wherein the client is a first client, the method further comprising:
receiving invitation information from a second client;
transmitting the invitation information to the first client; and
receiving an acceptance from the first client in response to the invitation information,
wherein the predetermined stage is a stage of the electronic game played by the second client.

9. The method of claim 7, further comprising:
redetermining the game effectiveness in response to an access by the first client when the electronic game is being live-streamed, and allowing the user to operate the electronic game at a stage of the live-streamed electronic game when the redetermined game effectiveness holds true.

10. The method of claim 7, wherein determining the game effectiveness includes determining whether a user is registered with a game service.

11. The method of claim 7, wherein the play information further indicates a scene in the predetermined stage, the scene starting before the predetermined stage is cleared, and
wherein the client is allowed to operate the electronic game at the scene indicated by the play information when the game effectiveness holds true.

* * * * *